United States Patent [19]
Barlas

[11] Patent Number: 5,131,288
[45] Date of Patent: Jul. 21, 1992

[54] REMOTE ACUAATOR FOR PARKING BRAKE CONTROL ASSEMBLY

[75] Inventor: Serge A. Barlas, Westland, Mich.

[73] Assignee: Dura Mechanical Components, Inc., Troy, Mich.

[21] Appl. No.: 448,424

[22] Filed: Dec. 11, 1989

[51] Int. Cl.⁵ .................... G05G 1/14; F16D 69/00
[52] U.S. Cl. .................... 74/512; 74/501.5 B; 74/575; 188/2 D; 188/265
[58] Field of Search .................... 188/2 D, 265; 74/501.5 R, 502, 575

[56] References Cited

U.S. PATENT DOCUMENTS

| | | | |
|---|---|---|---|
| 3,815,713 | 6/1974 | Dietrich | 188/265 X |
| 4,076,093 | 2/1978 | Mizuno | 188/265 X |
| 4,596,426 | 6/1986 | Clapp | 188/265 |
| 4,696,222 | 9/1987 | Han | 188/265 X |
| 4,795,002 | 1/1989 | Burgei et al. | 188/2 D |
| 4,838,109 | 6/1983 | Stewart | 188/2 D X |
| 4,850,455 | 7/1989 | Nuti | 188/2 D |
| 4,873,824 | 10/1989 | Cox | 188/265 |

FOREIGN PATENT DOCUMENTS

| | | | |
|---|---|---|---|
| 2454240 | 5/1976 | Fed. Rep. of Germany | 188/2 D |
| 0134036 | 8/1984 | Japan | 188/2 D |
| 2214257 | 8/1989 | United Kingdom | 188/2 D |

Primary Examiner—Vinh T. Luong
Attorney, Agent, or Firm—David A. Greenlee

[57] ABSTRACT

A park brake assembly (20) provides a hand or foot operated park brake actuator (30) connected to a drive reel (48) via a flexible motion transmitting core element (68). The drive reel (48) is connected to an isolator crank (56) via a lost motion connection (46). The isolator crank (56) is operatively connected to a control crank (76) which, in turn, directly actuates the park brake (26). The control crank (76) includes a lock sector (102) which coacts with a pawl (104) to selectively maintain the park brake (26) in a brake applied condition. When in the brake applied condition, the lost motion connection (46) allows the drive reel (48) to return to an unactuated position thereby eliminating all stresses from the actuator (30). The pawl (104) includes an elongated slot (108) and a trip spring (110) which coact to alternatively ratchet the pawl (104) against the lock sector (102) and then to disengage the pawl (104) from the lock sector (102) without requiring an independent release mechanism.

26 Claims, 6 Drawing Sheets

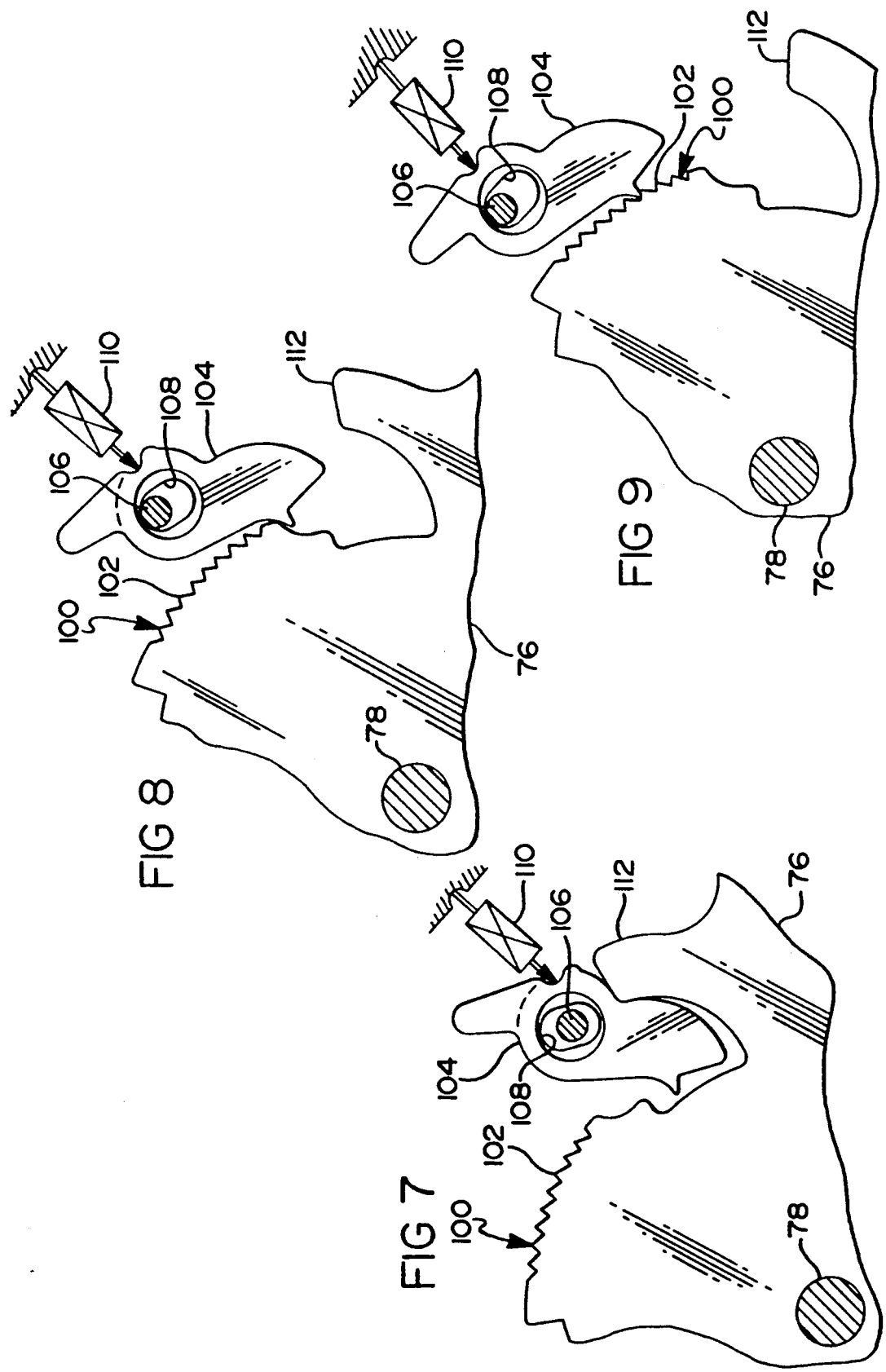

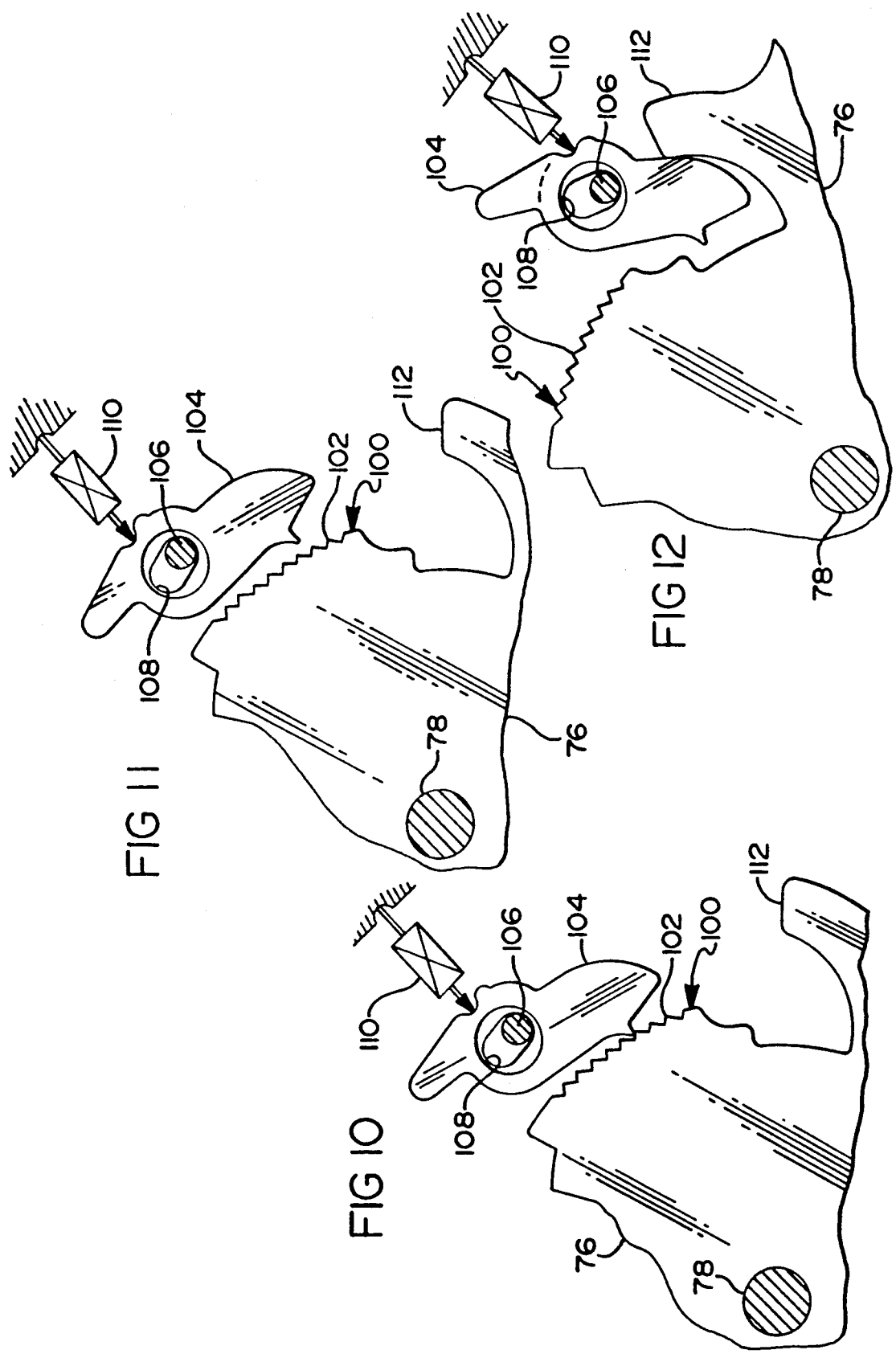

REMOTE ACUAATOR FOR PARKING BRAKE CONTROL ASSEMBLY

TECHNICAL FIELD

The subject invention relates to a control assembly for actuating the parking brake of a vehicle, and more particularly to a completely mechanical control assembly having a remote manual actuator.

BACKGROUND ART

Manually operated park brake control assemblies are typically positioned in the passenger compartment of a vehicle adjacent the operator and present a hand or foot operated lever to be manually operated by the vehicle operator for applying, or setting, the park brake. Generally, the hand or foot operated lever is supported on a pivot and integrally attached to a ratchet mechanism for maintaining the control assembly in an actuated condition in order to hold the park brake in the brake applied condition. The park brake is released by triggering some form of independent release mechanism.

Such prior art park brake control assemblies have two significant disadvantages. First, the entire mechanism must be located inside the passenger compartment. The physical size of the control assembly inside the passenger compartment prevents optimal use of the space in which it is located. As vehicle designs seek to conserve and better utilize all available space in the passenger compartment, such large and bulky park brake control assemblies become a greater design burden. Therefore, the first deficiency in the prior art park brake control assemblies relates to their inherently large size coupled with the unavoidable requirement that they be positioned inside the passenger compartment.

Second, flexible motion transmitting core elements, or cables, are typically used to interconnect the park brake control assembly and the park brakes at the rear wheels of the vehicle. As one park brake is located at each of the two rear wheels of most vehicles, two such cables must extend the majority of the distance between the control assembly and the park brakes. These cables must be of relatively high tensile strength because tensile forces in excess of 90 pounds can be generated between the control assembly and park brake during actuation, and maintained therebetween for very long periods of time. It will be appreciated that such high tensile strength cables are costly, heavy, and in addition are difficult to install and service due to their stiffness.

The U.S. Pat. No. 4,795,002 to Burgei et al, issued Jan. 3, 1983, discloses an electronic park brake control assembly located adjacent the brakes and having a remote actuator located inside the passenger compartment. Such fully electronic systems have not gained wide acceptance due to unreliability and difficulty in diagnosing the cause of system failures. Purely mechanical control assemblies are preferred in most situations yet cannot be divorced of their above-described disadvantages.

SUMMARY OF THE INVENTION AND ADVANTAGES

The subject invention contemplates a manually operated vehicular park brake assembly comprising an actuator means for mechanically transmitting forces applied by a vehicle operator, and a control means for receiving forces from the actuator means and selectively maintaining a park brake in a brake applied condition in response to the forces. The invention is characterized by an isolator means for isolating the forces between the actuator means and the control means while the control means maintains the park brake in the brake applied condition to remove stresses from the actuator means and thereby improve the operating efficiency of the system.

The subject invention overcomes the disadvantages inherent in the prior art by providing the isolator means which allows the stresses which occur while the park brake is in a brake applied condition to be completely isolated from the actuator means. From this it follows that the actuator means can be fabricated from lower strength, lower cost materials and hence supplies the necessary incentive to space the isolator means and the actuator means apart from each other as far as possible. The isolator means of the subject invention makes advantageous separating the actuator means from the control means so that only the actuator means need be provided inside the passenger compartment of the vehicle. The control means and the isolator means, on the other hand, can be located outside the vehicle, inside the vehicle trunk, or in some other ergonometricly advantageous position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 7 is an enlarged detail view of the ratchet means of the subject invention shown in the unactuated condition corresponding to FIGS. 2 and 3;

FIG. 8 is a view similar to FIG. 7, with the lock sector moving into ratcheting engagement with the pawl;

FIG. 9 is a view similar to FIG. 8, with the pawl in engagement with the lock sector corresponding to FIG. 4;

FIG. 10 is a view similar to FIG. 9, showing the trip spring moving over center of the pin to prepare the pawl for disengagement corresponding to FIG. 5;

FIG. 11 is a view similar to FIG. 10, showing the pawl disengaged from the lock sector corresponding to FIG. 6; and FIG. 12 is a view similar to FIG. 11, showing the recock arm preparing to move the pawl over center of the pin as the control crank moves back to the unactuated position.

DETAILED DESCRIPTION OF THE PREFERRED EMBODIMENT

Figure 1:
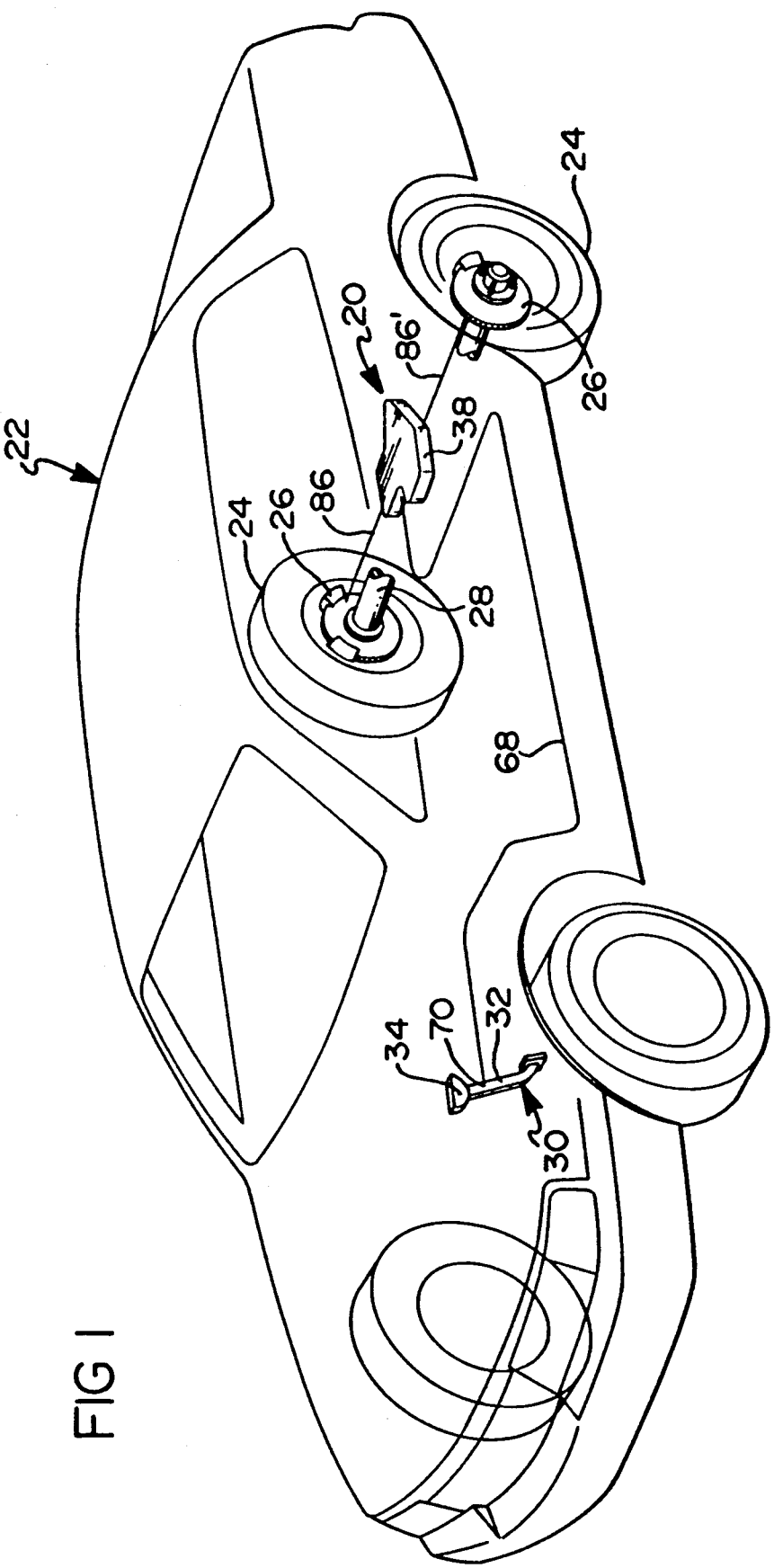
FIG. 1 is an environmental view of the subject invention disposed for use in a vehicle.

Referring to the Figures, wherein like numerals indicate like or corresponding parts throughout the several views, the subject park brake assembly is generally indicated at 20. In FIG. 1, the assembly 20 is shown in connection with a vehicle, generally indicated at 22. The vehicle 22 includes two rear wheels 24 each having a brake assembly. Each of the brake assemblies is provided with a park brake 26 used by the vehicle operator to set the vehicle 22 in a braked condition while not in use. The rear wheels 24 may be supported on a common axle 28, as is well known in the art.

The subject assembly 20 is manually operated and therefore includes an actuator means, generally indicated at 30, for mechanically transmitting forces applied by a vehicle operator to the park brakes 26. As shown in FIGS. 1 and 3-6, the actuator means 30 includes a lever 32 which is pivoted about a fulcrum 34 thereof in response to the forces applied by the vehicle operator. Although the lever 32 is shown in the accompanying Figures as being of the foot operated type, it will be appreciated by those skilled in the art that a hand operated actuator operates in substantially the same manner to yield the same result as the disclosed foot operated lever 32. The lever 32 is disposed inside the passenger compartment of the vehicle 22 in an easily accessed location for the vehicle operator, such as underneath the dashboard in the case of a foot operated lever 32, or alternatively underneath the dashboard or adjacent the driver's seat in the case of a hand operated lever.

The subject invention also includes a control means, generally indicated at 36, which is supported substantially within a protective housing 38, shown with its cover removed for clarity. The control means 36 receives forces from the actuator means 30 and selectively maintains the park brake 26 in a brake applied condition in response to such forces. In other words, as the operator rotates the lever 32 about its fulcrum 34, forces are mechanically transferred to the control means 36, which then transmits such mechanical forces to the park brake to maintain the park brake in a brake applied condition.

The subject invention is characterized by including an isolator means, generally indicated at 40, which is also disposed within the housing 38. The isolator means 40 functions to isolate the forces between the actuator means 30 and the control means 36 while the control means 36 maintains the park brake 26 in the brake applied condition to thereby remove stresses from the actuator means 30 and improve the operating efficiency of the assembly 20. The isolator means 40 is disposed between and interconnects the actuator means 30 and the control means 36 and prevents the feedback of stresses to the actuator means 30 while the control means 36 holds the park brake 26 in the brake applied condition. Therefore, the stress isolating function of the isolator means 40 operates only when the control means 36 maintains the park brake 26 in the brake applied condition.

Referring now to FIGS. 2-6, the isolator means 40 includes an input means, generally indicated at 42, for interconnecting the actuator means 30 and the isolator means 40. The isolator means 40 also includes an output means, generally indicated at 44, for interconnecting the control means 36 and the isolator means 40. The isolator means 40 includes a lost motion connection, generally indicated at 46, which is disposed between and interconnects the input means 42 and the output means 44. Therefore, the lost motion connection 46 is disposed between the actuator means 30 and the control means 36.

The input means 42 includes a bell-shaped drive reel 48 which is pivotally supported for arcuate movement about an isolator pivot 50. As shown in the Figures, the bell-shape of the drive reel 48 is formed by two straight edges 52 intersecting at an apex and joining to a common curved camming edge 54. The isolator pivot 50 is disposed between the two edges 52 adjacent the apex, with the camming edge 54 forming a concentric arc segment about the isolator pivot 50.

The output means 44 includes an isolator crank arm 56 which is also pivotally supported for arcuate movement about the isolator pivot 50 but is independently moveable of the drive reel 48. That is, the drive reel 48 and isolator crank 56 are moveable relative to each other in arcuate paths about the isolator pivot 50.

The lost motion connection 46 interconnects the drive reel 48 and the isolator crank 56. More specifically, as best shown in FIGS. 2-6, the lost motion connection 46 includes an arcuate slot 58 which is formed in the drive reel 48 and disposed concentrically about the isolator pivot 50. A finger 60 extends from the distal, free swinging, end of the isolator crank 56 and is disposed within the arcuate slot 58. The finger 60 is confined at all times within the slot 58 for movement between a first 62 and a second 64 terminal end of the arcuate slot 58.

The isolator means 40 further includes a biasing means 66 which interconnects the drive reel 48 and the isolator crank 56. The biasing means 66 urges the drive reel 48 in a first predetermined arcuate direction, clockwise as viewed in FIGS. 2-6, relative to the isolator crank 56. More particularly, the biasing means 66 comprises a flat wound coil spring, also known as a spiral torsion spring, having a radially displaced end operatively connected to the finger 60 and another end adjacent its center connected to the drive reel 48. The spring 66 constantly urges the drive reel 48 clockwise about the isolator pivot 50 but, due to the housing 38, is prevented from clockwise movement past the position shown in FIG. 2.

Referring to FIGS. 1-6, the actuator means 30 includes an elongated motion transmitting means 68 which interconnects the lever 32 and the drive reel 48 for mechanically transmitting motion between the lever 32 and the drive wheel 48 along a curved path. More specifically, the motion transmitting means 68 comprises a flexible cable having a first end 70 connected to the lever 32 and a second end 72 connected to the drive reel 48 at a connection 74. The second end 72 of the cable 68 is wound about the exterior of the drive reel 48, i.e., about the camming edge 54, in order to effect rotation of the drive reel 48 about the isolator pivot 50 in response to pivotal movement of the lever 32 about its fulcrum 34. As the vehicle operator urges the lever 32 to pivot about its fulcrum 34 when applying the park brake, the cable 68 is displaced a corresponding distance and mechanically urges the drive wheel 48 to rotate about the isolator pivot 50.

In FIGS. 2-6, the control means 36 is shown including a control crank arm 76 which is operatively connected to the isolator crank 56 for arcuate movement about a control pivot 78. A rigid link 80 extends between opposite ends thereof with one of the ends being pivotally connected to the isolator crank 56 and the other end pivotally connected to the control crank 76. Therefore, as the isolator crank 56 rotates about the isolator pivot 50, the control crank 76 is urged to rotate about the control pivot 78. The control pivot 78 and the isolator pivot 50 are spaced from one another and so disposed as to rotate the respective control crank 76 and isolator crank 56 in parallel planes.

The control means 36 includes at least one, and preferably two, brake throws 82, 84 which extend radially outwardly of the control pivot 78 and are integrally connected to the control crank 76. The two brake throws 82, 84 are disposed on opposite sides of the control pivot 78. The control crank 76 extends radially outwardly from between the two brake throws 82, 84, at an angle slightly less than 90° from the one brake throw 82 and slightly greater than 90° from the other brake throw 84.

The control means 36 further includes two cables 86, 86' having one end connected to one of the brake throws 82, 84 and the other ends operatively connected to a respective park brake 26 at one of the two rear wheels 24. Each cable 86, 86' is connected to one of the brake throws 82, 84 for interconnecting the associated brake throw 82, 84 with one of the park brakes 26. A slug 88, 88' is disposed on the end of each of the cables, 86' for attachment to the respective rake throw 82, 84.

Figure 2:
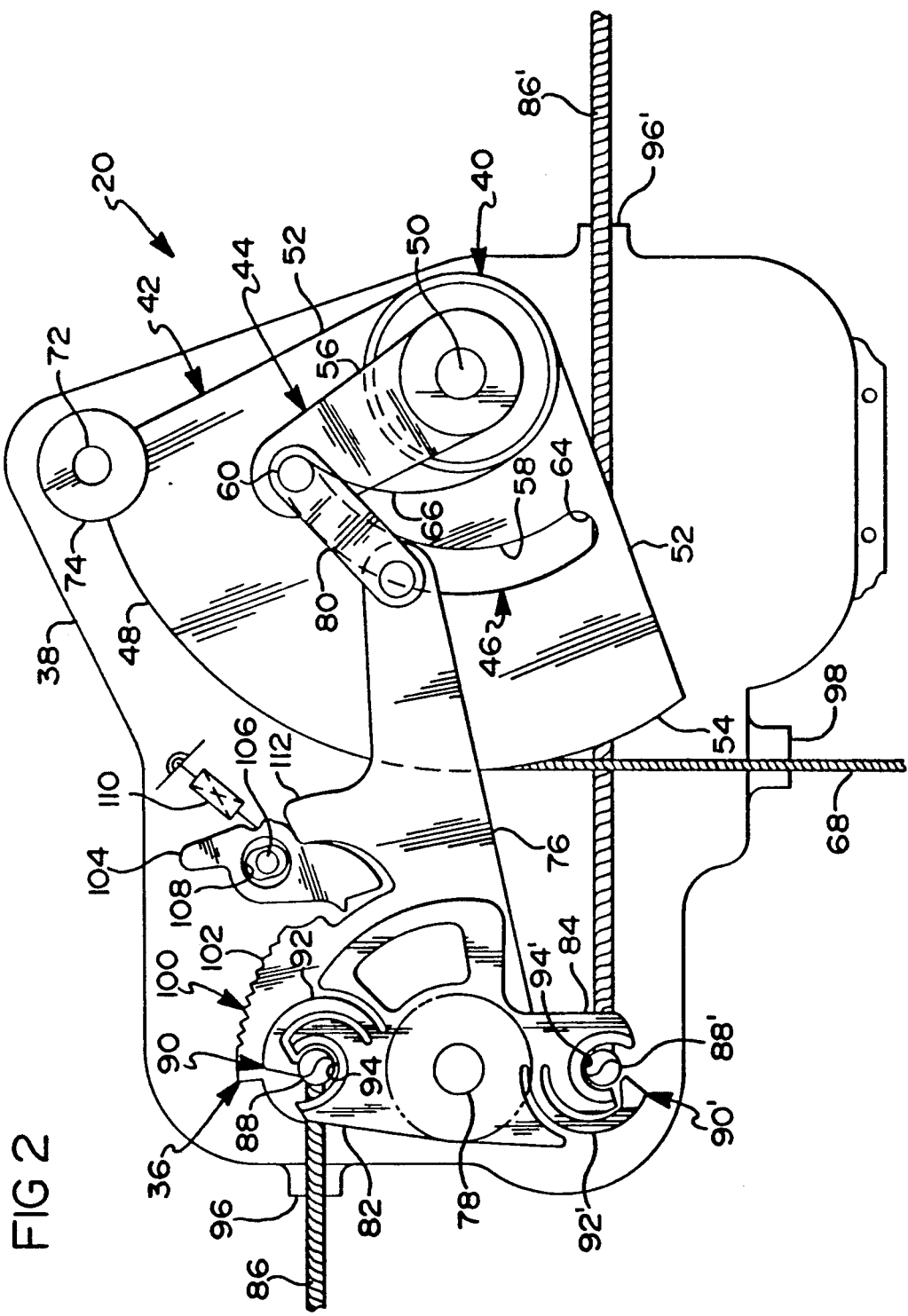
FIG. 2 is a plan view of an actuator according to the invention, with the cover removed to show the control means and isolator means.

An automatic fastener means, generally indicated at 90, 90' in FIG. 2, is provided for, automatically fastening the slug 88, 88' of each cable 86, 86' to its associated brake throw 82, 84 in response to a coupling force applied to interconnect two elements. The automatic fastener means 90, 90' each includes a resilient latch 92, 92' extending integrally from each brake throw 82, 84. A cup shaped pocket 94 is provided in each brake throw 82, 84 for receiving the slugs 88, 88'. The latches, 92' are resiliently disposed to support the slug 88, 88' in the respective pockets 94 yet allow easy insertion of the slugs ,88' into the pockets 94 for installation purposes. Cable passages 96' are provided through the housing 38 for each of the cables, 86, 86'. Similarly, a flexible element passage 98 is provided through the housing 38 for the flexible cable 68.

Referring now to FIGS. 2-12, the control means 36 is shown including a ratchet means, generally indicated at 100, for locking the control crank 76 in an angular position in response to a first applied force from the actuator means 30 and for unlocking the control crank 76 in response to a second successively applied force from the actuator means 30. The ratchet means 100 operates in toggle fashion by locking the control crank 76 in a brake applied condition in response to a first applied force from the actuator means 30, and then reversing itself and automatically unlocking the control crank 76 solely in response to a second successively applied force from the actuator means 30.

The ratchet means 100 includes a saw-toothed lock sector 102 comprising a series of ramps, or barbs, which coact with a pawl 104. The pawl 104 is supported on a pin 106 and adapted to engage the teeth of the lock sector 102 in ratcheting fashion. As perhaps best shown in FIGS. 8-12, the pawl 104 includes an elongated slot 108 which surrounds the pin 106 and serves to interconnect the pawl 104 and the pin 106.

The ratchet means 100 further includes a strategically located trip spring 110 which exerts a compressive force between the housing 38 and the pawl 104 for urging the pawl 104 to ratchetingly engage the lock sector 102 in response to the first applied force from the actuator means 30, and then for urging the pawl 104 to disengage from the lock sector 102 in response to a second applied force from the actuator means 30.

Figure 3:
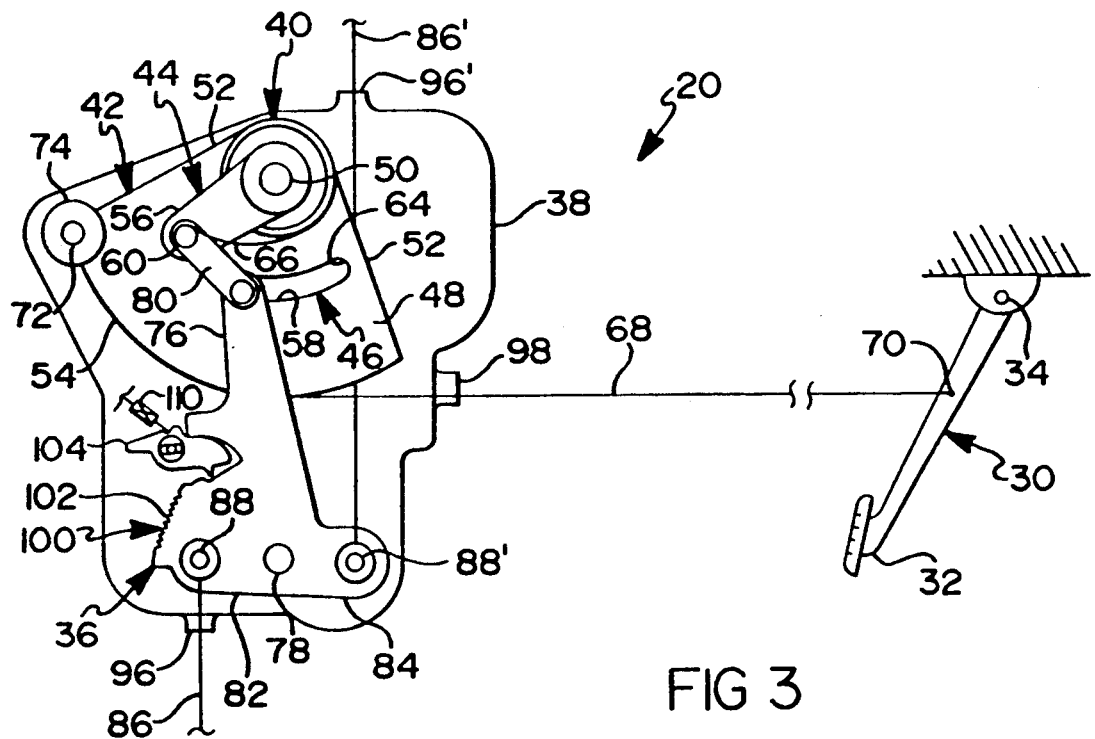
FIG. 3 is a view similar to FIG. 2, but partially schematicized to show the invention in an unactuated condition.

More particularly, in FIG. 7 the pawl 104 is shown in spacial relation to the lock sector 102 in an unactuated condition corresponding to FIGS. 2 and 3. As the lever 32 is pivoted about its fulcrum 34 to apply a first force to the control crank 76, the lock sector 102 rotates about the control pivot 78 until the pawl 104 makes initial contact with the lock sector 102 as shown in FIG. 8. This causes the pawl 104 to move relative to the pin 106 from the position shown in FIG. 7, wherein the pin 106 is generally centered in the elongated slot 108 to the position shown in FIG. 8, where the pin 106 is disposed in engagement with the rearward edge of the elongated slot 108.

This movement of the pawl 104 relative to the pin 106 causes the trip spring 110 to direct its biasing force on one side of the pin 106 and thereby apply a force on the pawl 104 tending to urge it in the clockwise direction, in ratcheting engagement with the lock sector 102. Therefore, as the lock sector 102 continues to rotate about the control pivot 78, the pawl 104 and lock sector 102 ratchet to the position shown in FIG. 9. FIG. 9 corresponds to the schematic illustration of FIG. 4 wherein the lever 32 has been fully actuated and the park brakes 26 have been placed in a brake applied condition.

As the vehicle operator releases the first applied force on the lever 32 the lock sector 102 rotates in reverse, or counter clockwise, direction about the control pivot 78, causing the pawl 104 to move rearwardly relative to the pin 106 until the pin 106 engages the forward edge of the elongated slot 108. This causes the trip spring 110 to move onto the opposite side of the pin 106 and thereby urges the pawl 104 to rotate in a counter clockwise direction about the pin 106. However, because the pawl 104 is engaged with the teeth of the lock sector 102, the pawl 104 and lock sector 102 remain operatively engaged to maintain the brake throws 82, 84 in a brake applied condition, as illustrated in FIG. 10.

Figure 6:
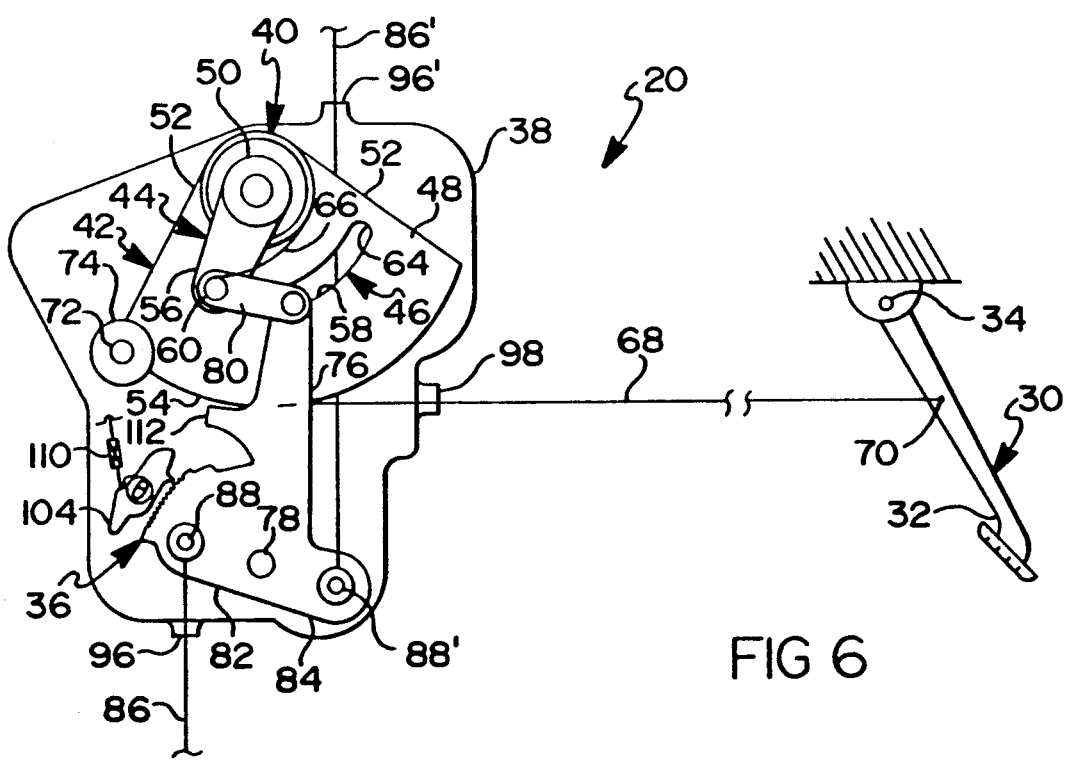
FIG. 6 is a view similar to FIG. 5, with the subject invention shown with the actuator means reactuated to disengage the pawl from the lock sector and return the assembly to the unactuated condition.

When the operator applies a second successive force to the lever 32, as represented in FIG. 6, to move the lock sector 102 slightly about the control pivot 78 in a clockwise direction, the trip spring 110 urges the pawl 104 to disengage the lock sector 102 as shown in FIG. 11. With this, the isolator means 40 ceases to isolate the forces between the control means 36 and the actuator means 30 as that the vehicle operator may gradually move the park brakes 26 from the brake applied condition back to an unactuated condition as shown in FIGS. 2 and 3.

The control crank 76 includes a recock arm 112 for urging the pawl 104 to engage the lock sector 102 after the second force has been applied by the actuator means 30. More particularly, the recock arm 112 and the pawl 104 include coacting camming surfaces which urge the pawl 104 to move relative to the pin 106 within the slot 108 so that the trip spring 110 will once again urge the pawl 104 in a clockwise direction about the pin 106 to ratchet with the lock sector 102.

OPERATION OF THE PREFERRED EMBODIMENT

Referring to the Figures, the operation of the preferred embodiment will be addressed presently. From the unactuated position shown in FIGS. 2 and 3, the vehicle operator applies a force to the lever 32 rotating it about its fulcrum 34. This, in turn, displaces the cable 68 such that the attached drive reel 48 is caused to rotate about the isolator pivot 50. With the first end 62 of the arcuate slot 58 in engagement with the finger 60, movement of the drive reel 48 concurrently urges the isolator crank 56 about the isolator pivot 50. By way of the rigid link 80, the control crank 76 is caused to rotate in a clockwise direction about the crank pivot 78 in response to counter clockwise movement of the isolator crank 56 about the isolator pivot 50. Such movement of the control crank 76 simultaneously causes each of the brake throws 82, 84 to displace their associated cables 86, 86', thereby actuating the park brake 26 and causing the lock sector 102 to ratchetingly engage the pawl 104.

Figure 4:
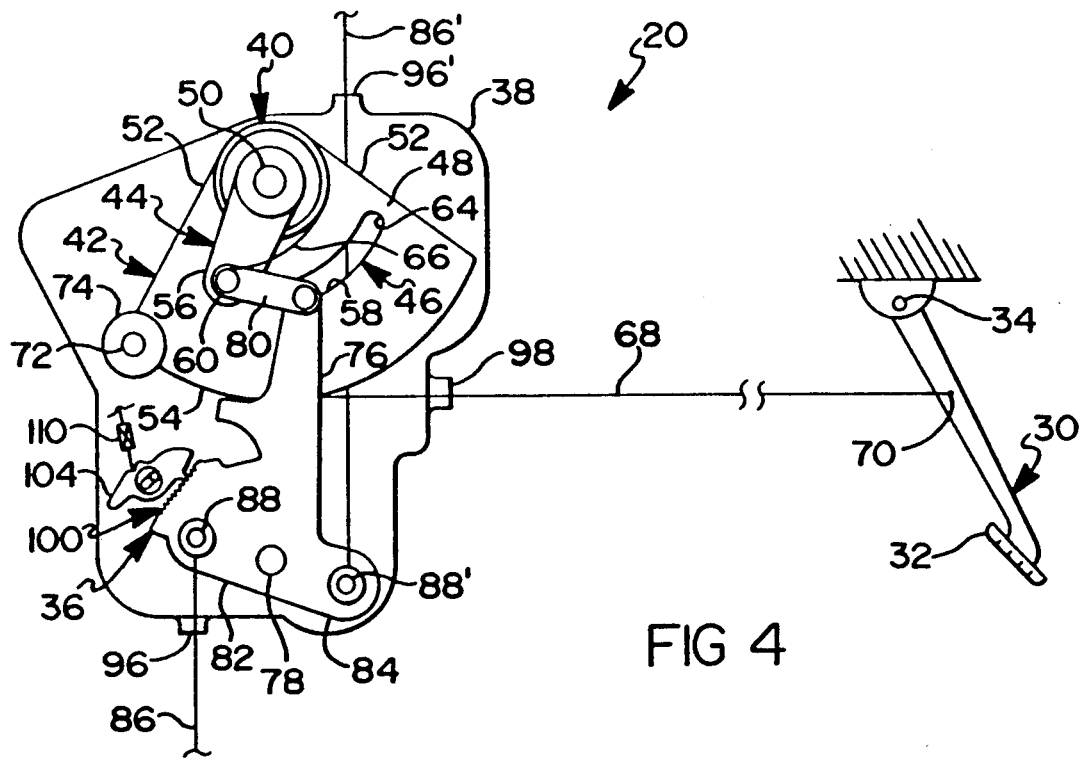
FIG. 4 is a view similar to FIG. 3, with the invention shown in the brake applied condition with the actuator means fully actuated.

As the brake throws 82, 84 rotate about the control pivot 78, they apply an increasingly greater leverage about the control pivot 78 upon the cables 86, 86'. That is, as the brake throws 82, 84 rotate toward the brake applied condition, each of the cables 86, 86' begin to move closer to the control pivot 78, thereby increasing the leverage while decreasing the displacement of the cables 86, 86'. In the preferred embodiment, the ratio will increase from the unactuated condition shown in FIGS. 2 and 3 at about 3.5:1 to a ratio as high as 4:1 in the fully applied condition as shown in FIGS. 4-6.

Figure 5:
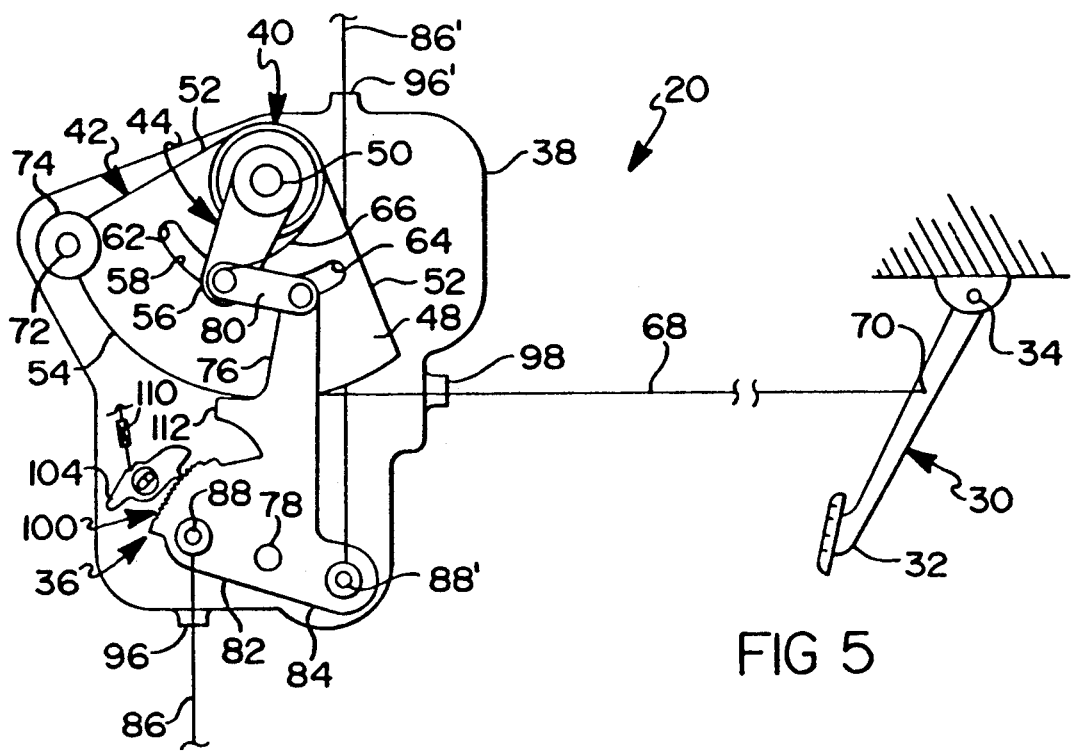
FIG. 5 is a view similar to FIG. 4, with the subject invention shown in the brake applied condition with the actuator returned to an unactuated position.

While the pawl 104 is engaged with the lock sector 102 to maintain the park brake 26 in a brake applied condition, the biasing means 66 urges the drive reel 48 to rotate in a clockwise direction back toward an unactuated position as shown in FIG. 5. Such retracting movement of the drive reel 48 urges the lever 32 back toward its unactuated position via the cable 68.

To release the park brakes 26 from the brake applied condition, the lever 32 is urged back toward its brake applied position until the first end 62 of the arcuate slot 58 contacts and slightly displaces the finger 60. This slight displacement of the finger 60 causes the control crank 76 to move a small arcuate degree in the clockwise direction about the control pivot 78 allowing the pawl 104 to disengage from the lock sector 102. The lever 32 is then slowly moved by the vehicle operator from the position shown in FIG. 6 back to the position shown in FIG. 3 and thereby gradually releasing the park brake 26 to an unactuated condition.

The primary advantage of the subject invention is that the isolator means 40 completely isolates the lever 32 and flexible cable 68 from the forces on the control means 36 while the park brakes 26 are maintained in a brake applied condition. More specifically, tensile forces of 90 pounds or greater may be required to maintain park brakes 26 in a brake applied condition. Hence, each of the cables 86 are required to withstand such a 90 pound tensile load for extended periods of time, and therefore must be constructed of very durable material. However, as the cable 68 is never required to maintain such a tensile load for any length of time greater than the brief moment required to actuate or deactuate the park brakes 26, the cable 68 can be fabricated from a much less durable, lighter and less expensive material.

Hence, the isolator means 40 supplies the necessary incentive to design the assembly 20 with the inexpensive flexible cable 68 spanning the greatest distance and the two heavy and expensive cables 86, 86' spanning a minimal distance. Therefore, as shown in FIG. 1, the housing 38 can be positioned adjacent the rear axle 28 with each of the cables 86, 86' extending a relatively short distance to their associated park brake 26. The inexpensive and light flexible cable 68, on the other hand, can be routed from the housing 38 adjacent the rear axle 28 to the lever 32 disposed within the passenger compartment of the vehicle. Additionally, the only structure required inside the passenger compartment of the vehicle 22 is the lever 32 and its support fulcrum 34. The relatively bulky control means 36 is positioned in an unobtrusive space, freeing the valuable interior space for maximum occupant comfort.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. A manually operated vehicle park brake assembly (20) for operating a park brake (26) comprising: actuator means (30) for mechanically transmitting forces applied by a vehicle operator; control means (36) for receiving forces from said actuator means (30) and selectively maintaining the park brake (26) in a brake applied condition in response to said forces; and elongated motion transmitting means (68) interconnecting said control means and said actuator means to transmit said forces; characterized by isolator means (40) including a lost motion connection (46) for isolating said forces between said actuator means (30) and said control means (36) while said control means (36) maintains the park brake (26) in the brake applied condition to remove stresses from said actuator means (30) and thereby improve operating efficiency.

2. An assembly (20) as set forth in claim 1 further characterized by said isolator means (40) including input means (42) for interconnecting said actuator means (30) and said isolator means (40) and output means (44) spaced from said input means (42) for interconnecting said control means (36) and said isolator means (40).

3. An assembly (20) as set forth in claim 2 further characterized by said lost motion connection (46) being disposed between said input means (42) and said output means (44).

4. An assembly (20) as set forth in claim 3 further characterized by said input means (42) including a drive reel (48) pivotally supported for arcuate movement about an isolator pivot (50).

5. An assembly (20) as set forth in claim 4 further characterized by said output means (44) including an isolator crank arm (56) pivotally supported for arcuate movement about said isolator pivot (50) independently of said drive reel (48).

6. An assembly (20) as set forth in claim 5 further characterized by said lost motion connection (46) interconnecting said drive reel (48) and said isolator crank (56).

7. An assembly (20) as set forth in claim 6 further characterized by said lost motion connection (46) including an arcuate slot (58) formed in said drive reel (48) and disposed concentrically about said isolator pivot (50) and a finger (60) confined within said arcuate slot (58) and extending from said isolator crank (56).

8. An assembly (20) as set forth in claim 7 further characterized by said isolator means (40) including biasing means (66) interconnecting said drive reel (48) and said isolator crank (56) for urging said drive reel (48) in a first predetermined arcuate direction relative to said isolator crank (56).

9. An assembly (20) as set forth in claim 8 further characterized by said actuator means (30) including a lever (32) for pivoting about a fulcrum (34) thereof in response to forces applied by the vehicle operator.

10. An assembly (20) as set forth in claim 9 further characterized by said elongated motion transmitting means (68) interconnecting said lever (32) and said drive reel (48) for transmitting motion between said lever (32) and said drive reel (48) along a curved path.

11. An assembly (20) as set forth in claim 10 wherein said motion transmitting means (68) includes a flexible element (68), further characterized by said flexible element (68) having one end (72) connected to said drive reel (48) and wound about the exterior thereof to effect rotation of said drive reel (48) about said isolator pivot (50) in response to pivotal movement of said lever (32) about said fulcrum (34).

12. An assembly (20) as set forth in claim 11 further characterized by said biasing means (66) including a flat wound coil spring.

13. An assembly (20) as set forth in claim 12 further characterized by said control means (36) including a control crank arm (76) operatively connected to said isolator crank (56) for arcuate movement about a control pivot (78).

14. An assembly (20) as set forth in claim 13 further characterized by said control means (36) including at least one brake throw (82, 84) extending radially outwardly of said control pivot (78) and integrally connected to said control crank (76).

15. An assembly (20) as set forth in claim 14 further characterized by said control means (36) including ratchet means (100) for locking said control crank (76) in an angular position in response to a first applied force from said actuator means (30) and unlocking said control crank (76) in response to a second successively applied force from said actuator means (30).

16. An assembly (20) as set forth in claim 15 further characterized by said ratchet means (100) including a lock sector (102) having a plurality of teeth disposed integrally along one edge of said control crank (76).

17. An assembly (20) as set forth in claim 16 further characterized by said ratchet means (100) including a pawl (104) supported on a pin (106) and adapted to engage the teeth on said lock sector (102).

18. An assembly (20) as set forth in claim 17 further characterized by said pawl (104) including an elongated slot (108) surrounding said pin (106).

19. An assembly (20) as set forth in claim 18 further characterized by said ratchet means (100) including a trip spring (110) for urging said pawl (104) to ratchetingly engage said lock sector (102) in response to said first applied force and urging said pawl (104) to disengage said lock sector (102) in response to said second applied force.

20. An assembly (20) as set forth in claim 19 further characterized by said control crank (76) including a recock arm (112) for urging said pawl (104) to engage said lock sector (102) subsequent to said second applied force.

21. An assembly (20) as set forth in claim 20 further characterized by said recock arm (112) and said pawl (104) including coacting camming surfaces.

22. An assembly (20) as set forth in claim 21 further characterized by said isolator means (40) including a rigid link (80) extending between opposite ends thereof with one of said ends being pivotally connected to said isolator crank (56) and the other of said ends being pivotally connected to said control crank (76).

23. An assembly (20) as set forth in claim 22 further characterized by said control means (36) including a cable (86) connected to said brake throw (82, 84) for interconnecting said brake throw (82, 84) and the park brake (26).

24. An assembly (20) as set forth in claim 23 further characterized by said cable (86) including a slug (88) for attachment to said brake throw (82, 84).

25. An assembly (20) as set forth in claim 24 further characterized by said control means including automatic fastener means (90) for automatically fastening said slug (88) of said cable (86) to said brake throw (82, 84) in response to a coupling force.

26. An assembly (20) as set forth in claim 25 further characterized by said automatic fastener means (90) including a resilient latch (92) extending integrally from said brake throw (82, 84).

* * * * *

UNITED STATES PATENT AND TRADEMARK OFFICE
CERTIFICATE OF CORRECTION

PATENT NO. : 5,131,288

DATED : July 21, 1992

INVENTOR(S) : Serge A. Barlas

It is certified that error appears in the above-identified patent and that said Letters Patent is hereby corrected as shown below:

In the TITLE:
"ACUAATOR" should read --ACTUATOR--.
In the SPECIFICATION:
Col. 1, line 2, in the title, "ACUAATOR" should read --ACTUATOR--.
Col. 5, line 38, "The latches, 92'" should read --The latches 92, 92'--.
Col. 5, line 41, "slugs, 88'" should read --slugs 88, 88'--.
Col. 5, line 42, "Cable passages 96' should read --Cable passages 96, 96'--.

Signed and Sealed this

Tenth Day of August, 1993

Attest:

MICHAEL K. KIRK

*Attesting Officer*     Acting Commissioner of Patents and Trademarks